(12) United States Patent
Riggio

(10) Patent No.: US 8,944,800 B2
(45) Date of Patent: Feb. 3, 2015

(54) KITCHEN TOOL APPARATUS AND METHOD

(76) Inventor: Richard R. Riggio, Philadelphia, PA (US)

( * ) Notice: Subject to any disclaimer, the term of this patent is extended or adjusted under 35 U.S.C. 154(b) by 82 days.

(21) Appl. No.: 13/243,522

(22) Filed: Sep. 23, 2011

(65) Prior Publication Data

US 2013/0078343 A1 Mar. 28, 2013

(51) Int. Cl.
*A21C 11/12* (2006.01)

(52) U.S. Cl.
CPC ...................................... *A21C 11/12* (2013.01)
USPC ........... 425/299; 425/118; 425/235; 425/238; 425/292; 425/297; 425/298; 425/318; 425/332; 425/369; 425/396; 426/503; 426/512

(58) Field of Classification Search
CPC ................................. A21C 9/00; A21C 11/00
USPC ........... 425/87, 238, 318, 368, 385, 117, 118, 425/195, 196, 235, 292, 296, 297, 298, 299, 425/369, 396, 403, 332; 426/391, 503, 512
See application file for complete search history.

(56) References Cited

U.S. PATENT DOCUMENTS

| | | | | | |
|---|---|---|---|---|---|
| 1,696,343 | A | * | 12/1928 | Burdick | 426/391 |
| 1,975,031 | A | * | 9/1934 | Wilkes et al. | 426/27 |
| 1,979,429 | A | * | 11/1934 | Wilkes et al. | 249/125 |
| 2,003,151 | A | * | 5/1935 | Lang | 249/104 |
| 2,089,396 | A | * | 8/1937 | Meilstrup | 426/499 |
| 3,908,022 | A | * | 9/1975 | Selleck | 426/27 |
| 3,971,118 | A | * | 7/1976 | Holmqvist | 29/412 |
| 4,348,949 | A | * | 9/1982 | Selleck | 99/426 |
| 4,356,995 | A | * | 11/1982 | Lohner | 249/112 |
| 4,446,982 | A | * | 5/1984 | Corse | 220/8 |
| 6,200,620 | B1 | * | 3/2001 | Brinker | 426/389 |
| 6,224,365 | B1 | * | 5/2001 | Ou-Young | 425/332 |
| 6,505,809 | B1 | * | 1/2003 | Reed | 249/95 |
| 6,753,030 | B2 | * | 6/2004 | Reed | 426/505 |

* cited by examiner

*Primary Examiner* — Seyed Masoud Malekzadeh
(74) *Attorney, Agent, or Firm* — Robert J. Yarbrough of; Lipton, Weinberger & Husick

(57) ABSTRACT

A kitchen tool applies texture to gnocchi or gnocchetti. The kitchen tool has a bottom surface defining a plurality of parallel longitudinal ridges. Serrations on the longitudinal ridges help the longitudinal ridges to grip a ball of dough. A cross ridge is generally normal to the longitudinal ridges and depends below the longitudinal ridges. Sides depend below the cross ridge and the longitudinal ridges. The kitchen tool may be a part of a kit that also includes a dry dough mix. A method of using the tool also is provided.

6 Claims, 8 Drawing Sheets

KITCHEN TOOL APPARATUS AND METHOD

I. BACKGROUND OF THE INVENTION

A. Field of the Invention

The apparatus of the invention is a tool for use in the kitchen. The apparatus of the invention is also a kit of parts for preparing a foodstuff. The method of the invention is a method of preparing a foodstuff using the apparatus of the invention. The tool, kit and method are useful for preparing gnocchi or gnocchetti, which are traditional staples of Italian cuisine.

B. Statement of the Related Art

Gnocchi are thick, soft dumplings. The dumplings may include wheat flour or may be gluten-free. The gnocchi may include eggs, cheese, potato, breadcrumbs or similar ingredients. A small gnocchi is known as a gnocchetti.

To make gnocchi from scratch, a cook will mix flour with water and other ingredients to form dough. The cook then will use any of various techniques to form the dough into many small balls. Because the gnocchi will be served with a sauce such as a tomato sauce, pesto or melted butter, the cook will apply texture to the gnocchi to provide an irregular surface to retain the sauce.

One traditional technique to applying texture to the balls of dough is to roll the ball using the underside of an ordinary dinner fork. The cook presses the flat underside of the tines of the fork into the dough ball while moving the fork in a longitudinal direction. The moving fork causes the ball of dough to roll. The moving tines create grooves in the rolling dough. When the cook reaches the end of the fork, the ends of the tines provide distinctive indentations to the dough. Other techniques may be used to texture the balls of dough, such as creating an indentation with the cook's finger or thumb. The textured balls of dough can be cooked immediately or can be preserved for later use by freezing or drying.

The cook places the textured balls of dough in boiling water to cook the gnocchi. As noted above, the cooked gnocchi are served with a sauce. The grooves and indentations retain the sauce, improving the dining experience.

For gnocchi that include wheat flour, the selected flour may be ordinary wheat flour or may be semolina, which is the flour used to create wheat-based pasta.

Wheat-based flours contain gluten. In sensitive persons, gluten can cause celiac disease, dermatitis herpetiformis and wheat allergy. Persons on a gluten-free diet must avoid gluten in all of its forms. A cook may prepare gnocchi while avoiding use of gluten-containing flours, flavoring agents, stabilizing agents or thickening agents by utilizing corn, rice, potato, tapioca or other gluten-free ingredients.

II. BRIEF DESCRIPTION OF THE INVENTION

The apparatus of the invention is for texturing balls of dough during the preparation of gnocchi. The apparatus comprises a body having two opposing sides, two opposing ends and opposing top and bottom surfaces. The body has a longitudinal axis.

The two opposing sides of the body are in a spaced-apart relation. The distance between the opposing sides is selected so that a cook can grip the two sides between the cook's thumb and a finger of one hand. Alternatively, the two opposing ends may be configured to be gripped by the cook.

The bottom surface of the body defines a plurality of raised longitudinal ridges that are parallel to the longitudinal axis. Each of the longitudinal ridges is defined by a pair of longitudinal ridge surfaces that intersect to define an acute angle having an apex. For each of the longitudinal ridges, the apex falls on a longitudinal line defined by the two intersecting longitudinal ridge surfaces. The plurality of longitudinal ridges defines a plurality of longitudinal lines that are parallel and that fall generally on and define a longitudinal ridge plane.

The number of longitudinal ridges may be selected to simulate the number of tines of a dinner fork. Alternatively, the number of longitudinal ridges may be any desired number.

Each adjoining pair of longitudinal ridges defines a valley. The valley is rounded because the intersection of the facing longitudinal ridge surfaces of each two adjacent longitudinal ridges is curved. Providing a curved intersection between adjacent longitudinal ridge surfaces, and hence a rounded valley, causes the kitchen tool to be easier to clean after use.

Each of the longitudinal ridges may exhibit a plurality of serrations distributed along the length of the longitudinal ridge. Each of the serrations interrupts the longitudinal ridge, increasing the grip of the longitudinal ridge on the ball of dough and rendering the apparatus easier to use by a cook.

The bottom surface of the body also defines a cross ridge. The cross ridge is defined by an intersecting pair of cross ridge surfaces. The cross ridge is generally normal to the longitudinal ridges and to the longitudinal axis. The intersecting pair of cross ridge surfaces also defines a cross ridge line. The cross ridge line generally is parallel to the longitudinal ridge plane, but extends from the body below the longitudinal ridge plane so that the cross ridge line is further from the body top surface than the longitudinal ridge plane. The cross ridge is located distal to the first end of the body and proximal to the second end.

The body may include side walls depending from the bottom surface of the body and proximal to either side of the body. The side walls each has a bottom edge that cooperate to define a side wall plane, the side wall plane being parallel to the longitudinal ridge plane, the body side wall plane extending below the cross ridge line so that the body side wall plane is further from the body top surface than the cross ridge line and the longitudinal ridge plane.

The top surface of the body may include any desired logo, trademark or other indicia.

To produce gnocchi, the cook will prepare balls of wheat-based or gluten-free dough in the conventional manner. The cook will place one of the balls of dough on a flat surface. The cook will grip the opposing sides of the body with the cook's thumb engaging one opposing side and the cook's finger engaging the other opposing side. The cook will place the bottom surface of the body in contact with the dough ball and will press the longitudinal ridges into the surface of the dough ball. The cook will then move the body in a direction parallel to the body's longitudinal axis with the bottom surface parallel to the flat surface. As the cook moves the body, the serrations on the longitudinal ridges cause the longitudinal ridges to grip the dough and cause the dough ball to roll. The longitudinal ridges impress parallel grooves into the surface of the dough ball.

As the dough ball rolls, the side walls confine the dough ball and reduce the flattening of the dough ball caused by the pressure from the bottom surface of the body. The motion of the body and the actions of the ridges and side walls act to urge the dough ball into a generally cylindrical shape with grooves about its circumference.

When the rolling ball of dough, now generally cylindrical in shape, reaches the cross ridge, the cross ridge impresses a cross ridge groove into the surface of the dough ball in a direction normal to the grooves impressed by the longitudinal ridges. The appearance of the cross ridge groove is reminiscent of the marks left in a dough ball by the end of the tines of a fork.

After the dough balls are textured using the apparatus, the dough balls may be cooked immediately in boiling water or may be frozen or dried for later use. The cooked dough balls, now gnocchi, are served with a sauce, such as tomato sauce, pesto or melted butter.

The apparatus of the invention may include a kit of parts for making gnocchi, which may be gluten-free gnocchi. The kit of parts includes the apparatus described above. The kit of parts also includes a conventional dry dough mix, which may be gluten free. The dough mix is a mix of dry ingredients, such as semolina flour and salt. Alternatively, the dough mix includes a gluten-free flour, such as potato or rice flour. Any conventional dry dough mix from which gnocchi may be made is contemplated by the invention.

In the method of the invention, a supplier will supply the apparatus of the invention to a cook and will instruct the cook to prepare gnocchi using the apparatus.

III. BRIEF DESCRIPTION OF THE DRAWINGS

IV. DESCRIPTION OF AN EMBODIMENT

Figure 1:
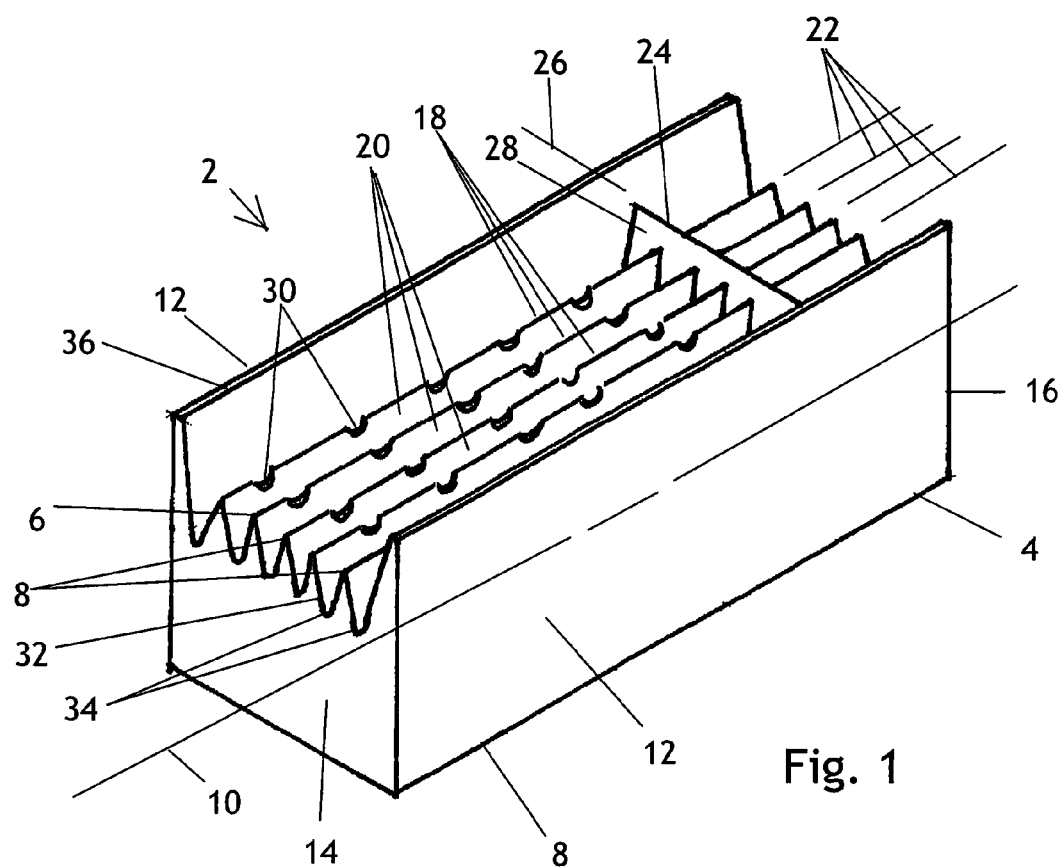
FIG. 1 is a perspective view of the bottom surface of the body of the apparatus.

The invention is a kitchen tool 2, a method for producing a foodstuff using the apparatus of the invention, and a kit of parts including the kitchen tool 2.

As shown by FIGS. 1-4, the kitchen tool 2 includes a body 4 having a bottom surface 6 and a top surface 8 disposed opposite to the bottom surface 6. The body has a longitudinal axis 10. The body has a pair of opposing sides 12, a first end 14 and an opposing second end 16.

The bottom surface 6 defines a plurality of longitudinal ridges 18 that extend parallel to the longitudinal axis 10 in the longitudinal direction. The longitudinal ridges 18 extend from first end 14 to second end 16. The number of longitudinal ridges 18 may be selected to mimic the number of tines on a conventional table fork, but any number of longitudinal ridges 18 may used.

Each longitudinal ridge 18 is defined by the intersection of a pair of longitudinal ridge surfaces 20. The pairs of longitudinal ridge surfaces 20 each intersects at an acute angle. The longitudinal ridge surfaces 20 may be planar. The intersection of each set of two longitudinal ridge surfaces 20 defines a longitudinal ridge line 22. The longitudinal ridge lines 22 fall on a longitudinal ridge plane and in combination define the longitudinal ridge plane. Each longitudinal ridge line 22 and the longitudinal ridge plane are parallel to the longitudinal axis 16.

Figure 2:
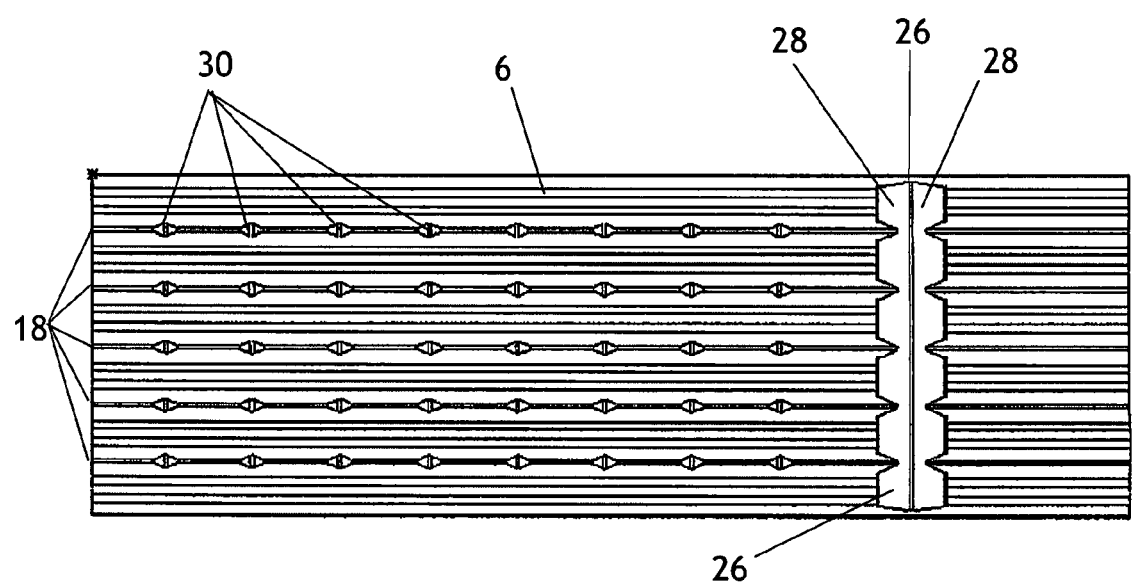
FIG. 2 is a bottom view of the apparatus.

From FIGS. 1 and 2, each longitudinal ridge 18 features serrations 30 distributed along its length. The serrations 30 serve to grip the dough when the tool is in use and to cause the dough to roll when the bottom surface 6 of the body 4 is placed in contact with the dough and moved in the longitudinal direction 10.

Figure 3:
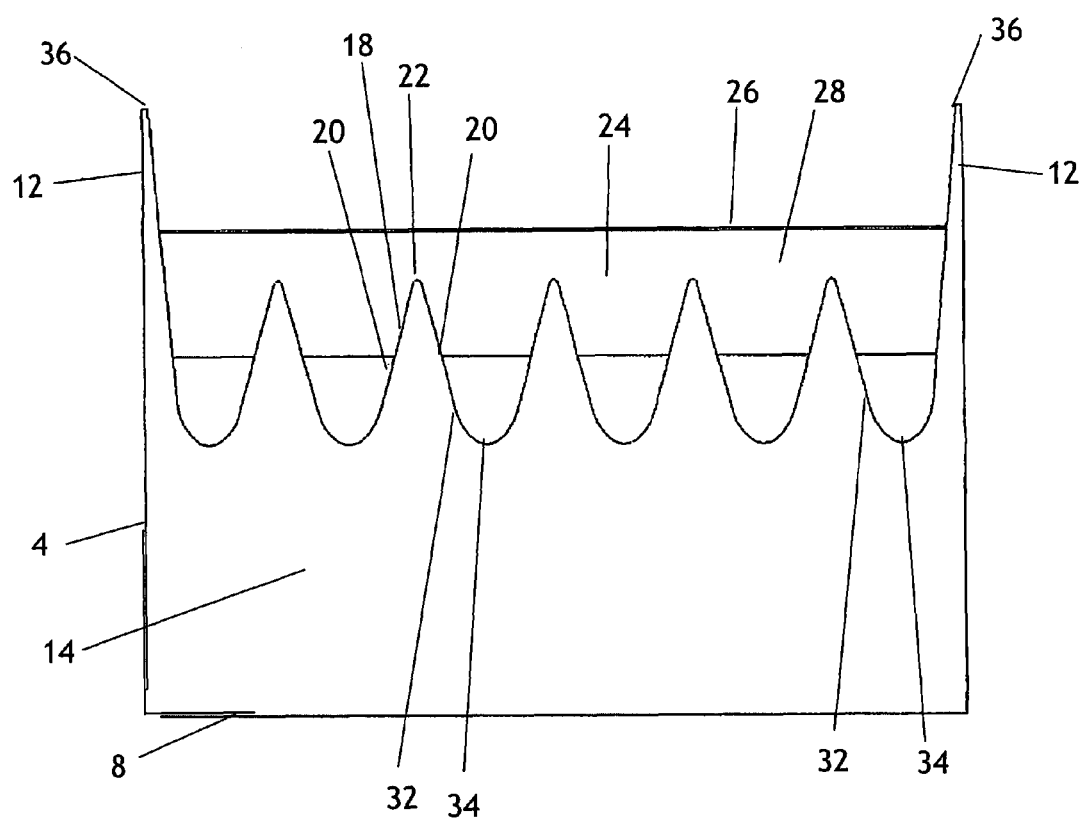
FIG. 3 is an end view of the apparatus

As shown by FIGS. 1, 2 and 3, the bottom surface 6 of the body 4 also defines a cross ridge 24. The cross ridge has a cross ridge line 26, defined by the intersection of two cross ridge surfaces 28. The cross ridge line 26 is disposed further away from the top surface 8 of the body 4 than is the longitudinal ridge plane and the longitudinal ridge lines 22. As a result, the cross ridge 24 depends further from the bottom surface 6 of the body 4 than do the longitudinal ridges 18.

From FIGS. 1 and 3, each adjacent pair of longitudinal ridges 18 defines a valley 32 between the ridges 8. The valley 32 is defined by the intersection of facing longitudinal surfaces 20 of adjacent longitudinal ridges 8. Each valley 32 has a bottom 34. The valley bottom 34 is preferably rounded for ease of cleaning of the kitchen tool 2.

Figure 4:
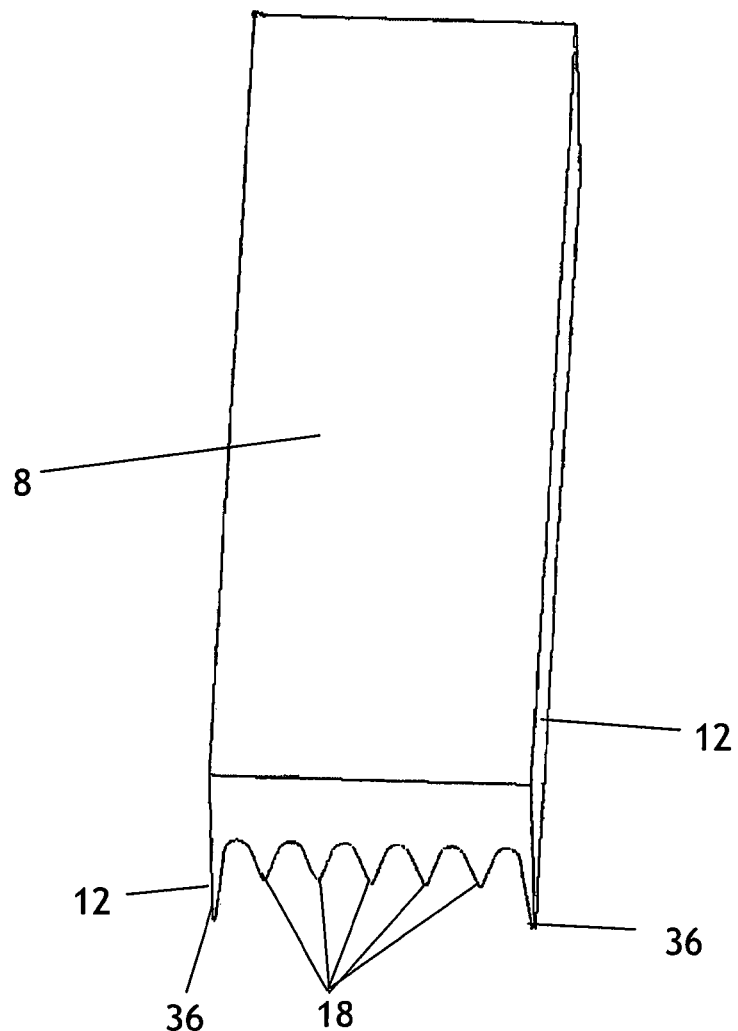
FIG. 4 is a perspective view of the top and end of the apparatus.

As shown by FIGS. 1, 3 and 4, the two sides 12 depend from the body 4 and define bottom edges 36. Bottom edges 36 extend further from the top surface 8 than the longitudinal ridges 18 and the cross ridge line 26. The two sides 12 and the longitudinal ridges 18 adjacent to the two sides 12 define valleys 32 between the sides 12 and the adjacent longitudinal ridges 18. The valleys 32 between the sides 12 and the adjacent longitudinal ridges 18 have curved bottoms 34.

Figure 5:
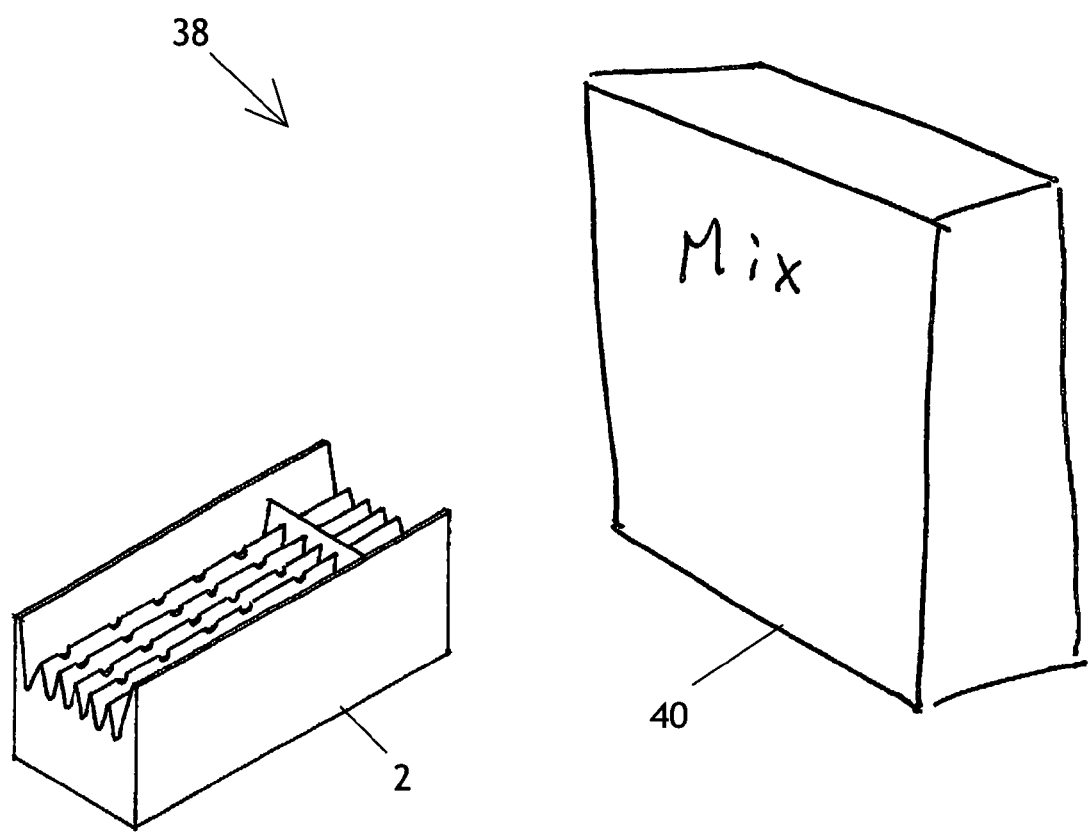
FIG. 5 is a perspective view of the kit of the invention.

The kit 38 of the invention is illustrated by FIG. 5. The kit includes the kitchen tool 2, as described above relating to FIGS. 1-4. The kit also includes a predetermined quantity of a dry dough mix 40. The dry dough mix 40 is selected so that the mix 40 will form dough suitable for gnocchi and suitable to be formed into small dough balls when the dry dough mix 40 is wetted. The dry dough mix 40 also is selected so that the small dough balls will roll when a small dough ball is placed on a flat, substantially horizontal surface and the bottom surface 6 of the kitchen tool 2 is placed in contact with the small dough ball and the kitchen tool 2 is moved in the longitudinal direction with the longitudinal ridge plane generally parallel to the flat surface. The dry dough mix 40 may be selected to be gluten-free.

Figure 6:
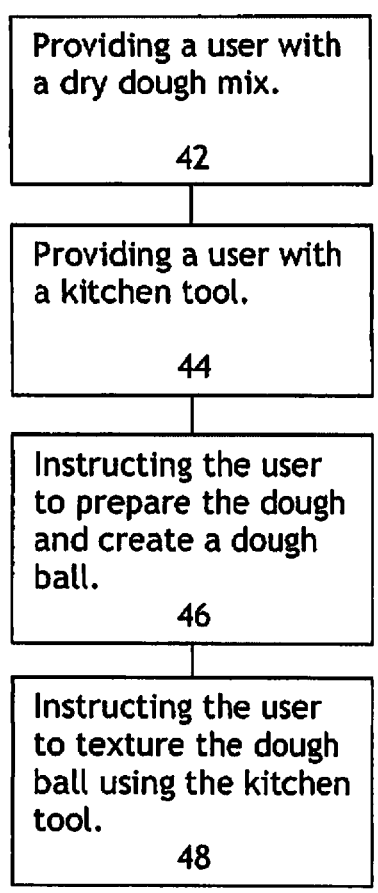
FIG. 6 is a flow chart of a method of the invention.

The method of the invention is illustrated by FIG. 6. As shown by FIG. 6 steps 42 and 44, a supplier provides a user with a dry dough mix 40 and with the kitchen tool 2 described above relating to FIGS. 1-5. The supplier may provide the user with the kit 38 described above, or may supply the kitchen tool 2 and dry dough mix 40 separately.

As indicated in step 46 of FIG. 6, the supplier instructs the user to prepare dough by wetting and mixing the supplied dry dough mix 40. The instructions may take any form known in the art. For example, the instructions may comprise a television infomercial or may include written instructions included with the kit 40, the tool 2 or the dry dough mix 40. The instructions may comprise a video recording or an audio recording. The instructions may appear on a web site, may include instructions provided in a streaming media, and may include instructions in any other format. As used in this document, the term 'wetting' the dry dough mix 40 includes wetting the dry dough mix 40 with any wetting agent known in the art, such as water, oil, one or more hen's eggs, or any other appropriate wetting agent. As noted above, the dry dough mix 40, and hence the resulting dough, may be gluten free.

Also from step 46, the supplier instructs the user to prepare one or more dough balls from the dough created by wetting and mixing the dry dough mix 40. As used in this document, the term 'dough ball' means a discrete portion of dough suitable in size and shape for making a gnocchi or gnocchetti.

Figure 7:
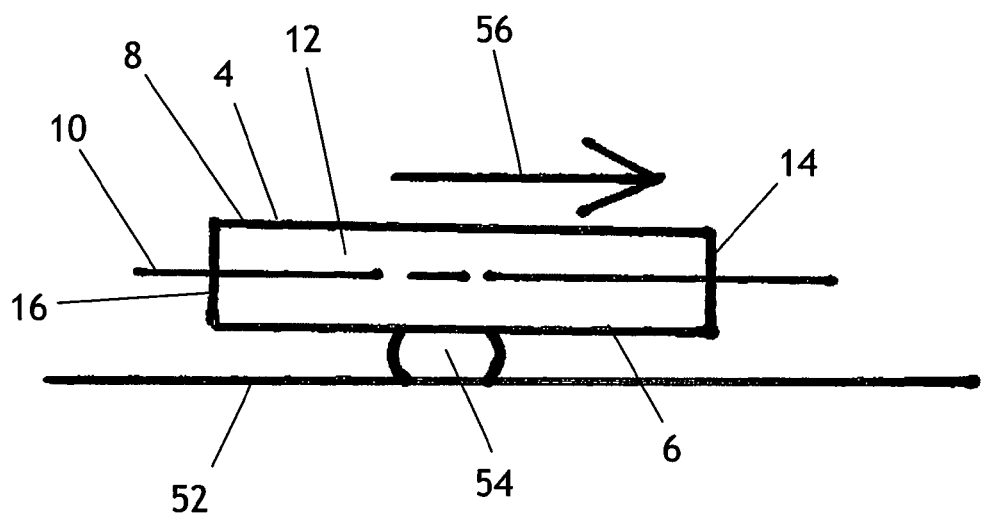
FIG. 7 is a side view illustrating use of the apparatus of the invention.

From step 48, the supplier will instruct the user to use the kitchen tool 2 to shape the outside surface of the gnocchi or gnocchetti. The shaping of the gnocchi or gnocchetti is illustrated by FIG. 7. The supplier will instruct the user to place the dough ball on a flat surface 52 and to hold the kitchen tool 2 above the flat surface 52. The user will place the bottom surface 6 of the body 4 in contact with the dough ball 54 so that the longitudinal ridges 18 are in contact with and indent the outside surface of the dough ball 54 and so that the longitudinal ridge plane and hence the longitudinal axis 10 are generally parallel to the flat surface 52. The user will move the body 6 in the direction indicated by arrow 56 parallel to the longitudinal axis 10. The longitudinal ridges 18, assisted by the serrations 30, will grip the dough ball 54, causing the dough ball 54 to roll between the flat surface 52 and the bottom surface 6 of the body 4. As the dough ball 54 rolls, the shape of the bottom surface 6 is impressed into the surface of the dough ball 54. When the dough ball 54 reaches the cross ridge 24, a deeper impression of the cross ridge 24 is created in the surface of the dough ball 54, resembling the impression created by the end of the tines of a fork. The sides 12 of the body 6 depend below the longitudinal ridges 18 and the cross ridge 24, constraining the lateral movement of the dough and reducing the tendency of the dough to be extruded laterally away from the longitudinal ridges 18.

Alternatively, the method may comprise the steps taken by the cook in preparing the gnocchi, as described above.

Figure 8:
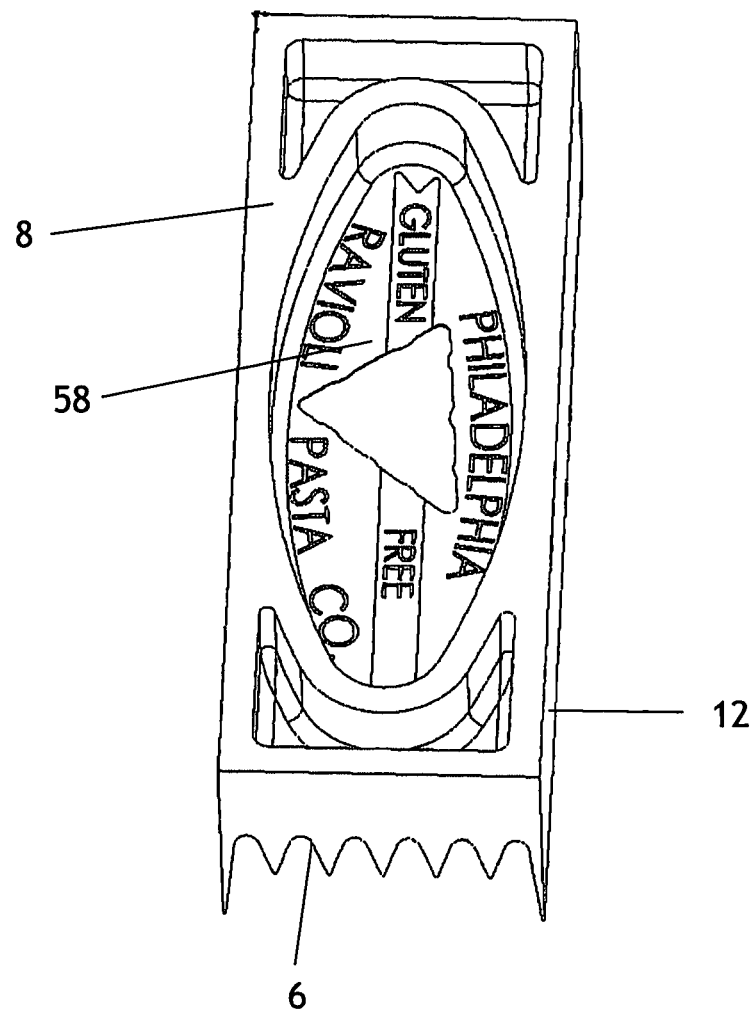
FIG. 8 is a perspective view of the top surface of the body featuring a logo, trademark or other indicia.

From FIG. 8, the top surface 8 of the body 4 may include any desired indicia 58, such as a trademark or other logo.

I claim:

1. A kitchen tool apparatus for texturing a gnocchi, the apparatus comprising:
   a. a body, said body defining a bottom surface and a top surface opposite to said bottom surface, said body having a longitudinal axis, said body defining a first end and a second end;
   b. said bottom surface defining a plurality of longitudinal ridges, said longitudinal ridges being raised, said longitudinal ridges being parallel to said longitudinal axis and configured to impress parallel grooves into a surface of the gnocchi, each of said plurality of longitudinal ridges defines a longitudinal line, and a plurality of said longitudinal lines in combination defining a longitudinal ridge plane, wherein each said longitudinal ridge defines a plurality of serrations distributed along a length of said longitudinal ridge, whereby each said serration is configured to increase a grip of each said longitudinal ridge against the gnocchi;
   c. a cross ridge, said cross ridge being defined by said bottom surface of said body, said cross ridge being disposed intermediate to said first and said second ends and proximal to said second end, said cross ridge being distal to said first end, said cross ridge defining a cross ridge line, said cross ridge line being generally normal to said plurality of longitudinal lines and being generally parallel to said longitudinal ridge plane, said cross ridge line being disposed further away from said top surface of said body than said longitudinal ridge plane.

2. The kitchen apparatus of claim 1, the apparatus further comprising: a pair of sides defined by said body, said pair of sides being opposing, said pair of sides depending from said bottom surface of said body, said sides each defining a bottom edge, said two sides extending between said first end and said second end of said body, said bottom edges of said two sides extending further from said top surface that said longitudinal ridges and said cross ridge line.

3. The kitchen apparatus of claim 1 wherein each of said longitudinal ridges is defined by an intersection of a pair of longitudinal ridge surfaces, said intersection of said longitudinal ridge surfaces defining said longitudinal ridge line, each said longitudinal ridge being adjacent to at least one other said longitudinal ridge, each two of said adjacent longitudinal ridges defining a valley between said adjacent longitudinal ridges, said valley having a bottom, said bottom being curved.

4. The kitchen apparatus of claim 3 wherein said longitudinal ridge surfaces are planar.

5. The apparatus of claim 1 wherein said plurality of longitudinal ridges extends between said first end and said second end.

6. The apparatus of claim 1 wherein said cross ridge line is defined by an intersection of two cross ridge surfaces, said cross ridge surfaces being disposed on opposing sides of said cross ridge, said cross ridge surfaces intersecting in an angle.

* * * * *